(12) United States Patent
Wang

(10) Patent No.: US 7,228,024 B2
(45) Date of Patent: Jun. 5, 2007

(54) OPTICAL RETURN LOSS DETECTING DEVICE

(75) Inventor: Xiao-Yong Wang, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 243 days.

(21) Appl. No.: 10/892,117

(22) Filed: Jul. 16, 2004

(65) Prior Publication Data

US 2005/0180747 A1    Aug. 18, 2005

(30) Foreign Application Priority Data

Feb. 17, 2004   (TW) ............................ 93103827 A

(51) Int. Cl.
*G01N 21/00* (2006.01)
(52) U.S. Cl. .................. 385/15; 356/73.1; 356/460; 356/461; 356/462; 356/463; 356/464; 356/465; 356/466
(58) Field of Classification Search ............... 356/73.1; 385/15
See application file for complete search history.

(56) References Cited

U.S. PATENT DOCUMENTS

| 5,221,839 | A | 6/1993 | Braun .................... 250/227.24 |
| 5,822,094 | A | 10/1998 | O'Sullivan .................. 359/110 |
| 6,111,676 | A | 8/2000 | Lemus et al. ............... 359/124 |
| 6,580,498 | B1 * | 6/2003 | Harley ....................... 356/73.1 |
| 6,810,210 | B1 * | 10/2004 | Veilleux ....................... 398/17 |
| 7,016,024 | B2 * | 3/2006 | Bridge et al. ............... 356/73.1 |

FOREIGN PATENT DOCUMENTS

| CN | 02229282.9 | 3/2003 |
| CN | 02159350.7 | 5/2003 |

* cited by examiner

*Primary Examiner*—Frank G. Font
*Assistant Examiner*—Mary El-Shammaa
(74) *Attorney, Agent, or Firm*—Troxell Law Office, PLLC

(57) ABSTRACT

An optical return loss detecting device is provided for measuring the optical return loss (ORL) of a device under test (DUT). The detecting device comprises a light source, an optical isolator connected to the light source for preventing reflected light by the DUT entering the light source, a first optical coupler connected to the isolator, a second optical coupler connected to the first coupler and the DUT respectively, and a module communicating with the second coupler for performing test and calculation functions thereof.

34 Claims, 2 Drawing Sheets

OPTICAL RETURN LOSS DETECTING DEVICE

TECHNICAL FIELD

The present invention relates to an optical return loss detecting device, particularly to an optical return loss detecting device which is compact and can precisely measure the optical return loss value of optics devices.

DESCRIPTION OF RELATED ARTS

Optical return loss (ORL) is a very important reference mark of an optics device. ORL refers to a ratio of the light power reflected back to the incident path thereof to the total incident light power and the unit thereof is dB. The formula thereof is ORL=$10^n$ log(Pi/Pr) (db), among which Pi is the incident light power while Pr refers to the reflected light power. The performance of a laser device will become worse due to the ORL, and moreover the frequently-reflected light beams will interfere with each other within the light propagating path thereof which can adversely affect the normal propagation of optical signals and increase the occurrence of noises in the meantime thereby resulting in the ratio of the error signals increased thereof. ORL of optics devices normally originate from Fresnel Reflections and Rayleigh Scattering.

A common method for decreasing ORL is to use an interface with a certain angled inclination. However, this method can only reduce ORL which is caused by the interface while is not effective for the ORL resulted by other factors such as grating reflection. A published Chinese invention application CN02159350.7 discloses a diffraction grating wavelength division Multiplexer (WDM) with low ORL. The diffraction grating DWM includes an input waveguide, an output waveguide, an etched grating and a free zone for propagation therethrough. This patent can be applied for a WDM system thereby enhancing the ORL performance thereof.

The value of ORL is preferred to be as low as possible for some optics devices, but in certain circumstances high ORL value is pursued on the other hand. For example, a U.S. Pat. No. 5,221,839 gives such an optical receiver which aims at avoiding disturbing some active devices such as a distributed feedback laser source. When such kind of optical receiver is used in a lightwave component measurement system for measuring modulation waveband, high ORL can also be applied to reduce the mismatch situation of the measurement uncertainty thereof.

In a high density light propagation system, a special device is commonly provided to measure ORL for monitoring the propagation situation of the system. As the light propagation system propagates signals along an optical path over a few wavelengths in a single medium such as an optical fiber, and the signals may also have different wavelengths, different paths and equipments are thus resulted. Moreover, even the measurements are based on each optical path, the reflection power of each signal is different from each other. By isolating the return loss thereof with regard to a specific wavelength, the ability of detecting errors occurred in the light propagation system can be increased thereby timely getting the excessive quantity of ORL of the signal transmission over a certain wavelength. Quantity of the ORL can also be detected at an increased level at the output of an optical amplifier such as an erbium doped fiber amplifier (EDFA).

Nowadays, a main method used in optical communication for measuring ORL can refer to FIG. 1 showing the theory thereof. In brief, a light source and a power meter together are connected to a device under test (DUT). The power of the incident light from the light source and the power of the reflected light received by a photoelectric diode after passing through the DUT are measured respectively. The power of the incident light is divided by the power of the reflected light and the result thereof is then computed applying the logarithm rule thereby producing the corresponding ORL value thereof.

An optical time domain reflectometer (OTDR) can be adopted to measure the power of light reflected by an optical component. An OTDR may send short pulses of light down an optical fiber under test and detect the signals returned along the under test fiber. Although using the OTDR to measure the reflected light power can get the value accurately, the application of an OTDR is expensive and OTDR is a relatively large piece of test equipment which is not always feasible for all application circumstances, such as the application of measuring the reflected light power from an end of an optical fiber, especially when there is traffic on the fiber. In addition, an optical frequency domain reflectometer (OFDR) can also be used to detect possible faults in an optical link. According to this method, the optical frequency is varied and optically coherent detection is used, or an optical source is modulated with a constant amplitude tone that is swept in frequency.

U.S. Pat. No. 5,822,094 discloses a technology for detecting ORL which measures ORL over an average of wavelengths, but it does not measure ORL on a single wavelength basis. While U.S. Pat. No. 6,580,498 provides an apparatus and method for a light transmission system. The apparatus thereof can detect ORL on a single wavelength basis at the output of an optical circuit pack which adopts an optical switch.

Still another U.S. Pat. No. 6,111,676 also discloses an apparatus for detecting ORL on a single wavelength basis. This patent describes a wavelength specific optical reflection meter/locator in signatured wavelength division multiplexed systems. This optical reflection meter/locator requires a unique intensity dither on each wavelength that is known to the optical amplifier. However, in the case of unknown wavelength sources, information regarding the intensity dither is not known or difficult to acquire.

In addition, a Chinese utility patent ZL02229282.9 gives an on-line exploring device for optics communication to detect corresponding ORL. The on-line exploring device is the result of alteration to existed light transmission apparatus. The features thereof include a coupling unit connected to a light input port of the light transmission apparatus with a 1*2 type fiber coupler located therein. One output of the fiber coupler is connected to the light transmission apparatus and another output thereof is connected to an exploring means which is set in the light transmission apparatus. The exploring means comprises a few modules with specific functions like detecting broken points within the link thereof, etc. The testing means can on-line test the cases of ORL, power, wavelengths and broken points thereof, then send the tested results to the station of the network administration centre of the light transmission apparatus and display the tested results on the monitor device of the network administration centre.

However, in a practical exploring system, since the power of incident light is much higher than the reflected light power and the reflected light might affect the output of a laser, corresponding exploring circuits have to be carefully designed to measure the powers of the incident light and reflected light in the mean time.

SUMMARY OF THE INVENTION

A main object of the present invention is to provide an optical return loss (ORL) detecting device which can precisely measure the ORL value of an optical component.

A second object of the present invention is to provide an optical return loss (ORL) detecting device which adopts compact circuit configurations thereby effectively reducing noise interferences thereof.

A third object of the present invention is to provide an optical return loss (ORL) detecting device which comprises an optical isolator directly connected to a light source for preventing reflected light from entering the light source, thereby avoiding possible adverse influences towards the stability performance of the light source by the reflected light.

A forth object of the present invention is to provide an optical return loss (ORL) detecting device which owns the function for measuring the optical inserting loss.

A fifth object of the present invention is to provide an optical time domain reflectometer (OTDR) which can measure the reflected light by a specific optical interface or component separated a certain distance from the light source of a light transmission system, thereby detecting whether the interface or component is within a normal working status or not.

In order to achieve the objects set forth, an optical return loss detecting device is provided in accordance with the present invention for measuring the optical return loss (ORL) of a device under test (DUT). The detecting device comprises a light source, an optical isolator connected to the light source for preventing reflected light by the DUT entering the light source, a first optical coupler connected to the isolator, a second optical coupler connected to the first coupler and the DUT respectively, and a module communicating with the second coupler for performing test and calculation functions thereof.

The isolator is connected to a first port of the first coupler, a third port of the first coupler is connected to the module and a fourth port of the first coupler is connected to a first port of the second coupler. A second port of the second coupler is connected to the module, and a third port of the second coupler is connected to the DUT.

Meanwhile, the coupling ratio between the third and fourth ports of the first coupler can be 1:99. The coupling ration between the third and fourth ports of the second coupler can be 80:20, or be 50:50. The two coupling ratios of the first and second couplers can be pre-determined according to specific requirements thereof.

The module includes an optical exploring device, an operation amplifying device, a relay control device and a micro-control unit which are connected with each other in turn.

The relay control device includes first, second and third relay means, among which the input port of the first relay means is connected to the output port of the operation amplifying device, and the input ports of the second and third relay means are respectively connected to the first and second output ports of the first relay means.

The relay control device also includes a capacitor, one end of the capacitor is respectively connected to the input port of the first relay means and the output port of the operation amplifier, and the other end thereof is respectively connected to the first input port of the operation amplifying device and the output port of the optical exploring device.

The output port of the optical exploring device is connected to the first input port of the operation amplifying device, and the second input port of the operation amplifying device is grounded.

The voltage difference between the input port of the optical exploring device and the second input port of the operation amplifying device is −5v.

The relay control device further comprises first, second, third and fourth resistors, among which one end of each of the four resistors are together connected to the end of the capacitor opposite to the first relay means; the ends of the first and second resistors, which are both opposite to the capacitor, are respectively connected to the first and second output ports of the second relay means; and the ends of the third and fourth resistors, which are both opposite to the capacitor, are respectively connected to the first and second output ports of the third relay means.

The resistance values of the first, second, third and fourth resistors are increased according to a predetermined multiple relationship so as to realize corresponding control of the module. For example, the multiple relationships between the resistance values of the first, second, third and fourth resistors can be 50. That is, the resistance values of the first, second, third and fourth resistors are 400 ohm, 20 K ohm, IM ohm and 50M ohm in consequence.

Corresponding voltages are applied onto the first, second, third and fourth relay means via according I/O ports.

The optical exploring device includes first and second optical detecting means, and the operation amplifying device comprises first and second operation amplifiers. The input port of the first optical detecting means is connected to the third port of the first coupler, and the output port thereof is connected to the operation amplifying device; the input port of the second optical detecting means is connected to the second port of the second coupler, and the output port thereof is connected to the operation amplifying device.

The input port of the first optical detecting means is connected to the input port of the first operation amplifier, and the output port of the second optical detecting means is connected to the input port of the second operation amplifier.

The module also includes an analog-digital conversion device which is positioned between the operation amplifying device and the micro-control device. The end of the capacitor, which is connected to the input port of the first relay means and the output port of operation amplifying device, is also connected to the analog-digital conversion device.

The analog-digital conversion device includes first and second analog-digital conversion means, whose output ports are both connected to the micro-control unit and the input ports thereof are connected respectively to the output ports of the first and second operation amplifiers for converting according analog signals into digital signals which are then inputted into the micro-control unit.

The micro-control unit can perform the function of 24 bit AD collection. The light source is a laser diode. The micro-control unit is respectively connected to a liquid crystal display device and a calculator, and is connected to a computer via a RS-232 port.

Other objects, advantages and novel features of the invention will become more apparent from the following detailed description when taken in conjunction with the accompanying drawings.

DETAILED DESCRIPTION OF PREFERRED EMBODIMENT

Figure 1:
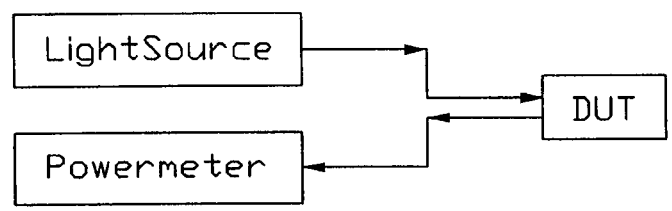
FIG. 1 is a block view illustrating the principle of a prior art.
Figure 2:
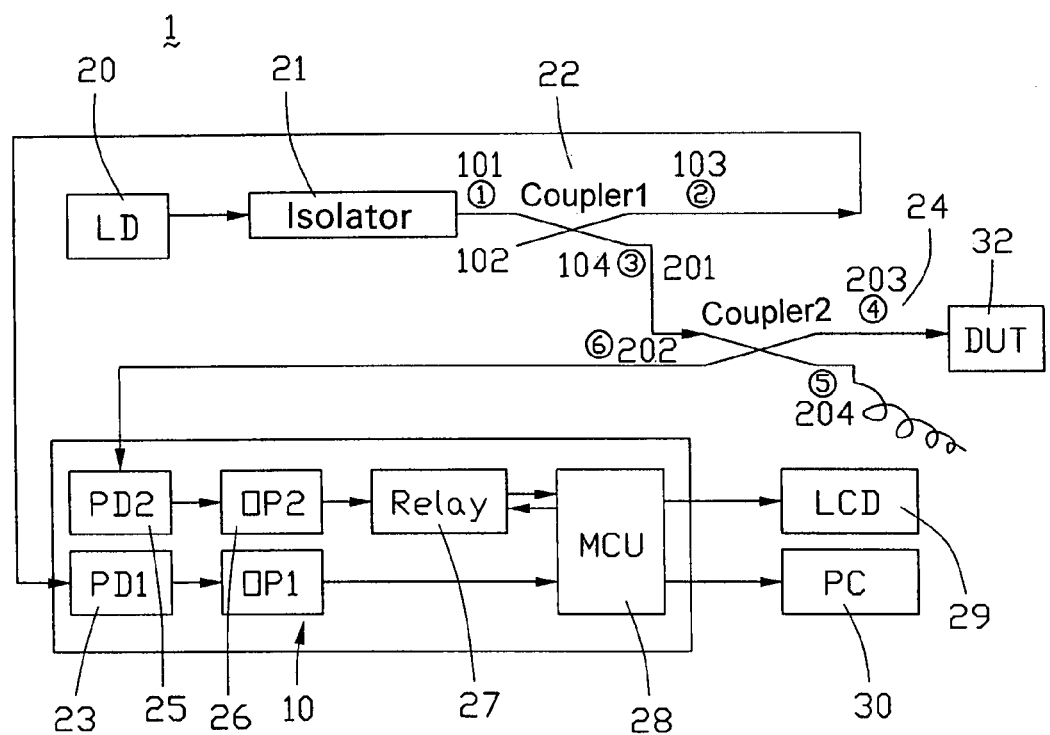
FIG. 2 is a circuit diagram of the present invention.

Referring to FIG. 1, an optical return loss detecting device or exploring device is provided in accordance with the present invention for measuring the optical return loss (ORL) of a device under test (DUT) 32. The detecting device comprises a light source 20, an optical isolator 21 connected to the light source 20 for preventing reflected light by the DUT 32 entering the light source 20, a first optical coupler 22 connected to the isolator 21, a second optical coupler 24 connected to the first coupler 22 and the DUT 32 respectively, and a module 10 communicating with the second coupler 24 for performing test and calculation functions thereof. The light source 20 can be a laser diode.

The first port 101 of the first coupler 22 is connected to the isolator 21, the third port 103 is connected to the module 10 and the fourth port 104 thereof is connected to the first port 201 of the second coupler 24. The second port 202 of the second coupler 24 is connected to the module 10, the third port 203 is connected the DUT 32, and the fourth port 204 can be made to consume possible light power propagated therethrough by means of directly coiled.

The splitting ratio (coupling ratio) between the third port 103 and the fourth port 104 of the first coupler 22 can be 1:99, and no specific limitation is imposed upon the coupling ratio between the third port 203 and the fourth port 204 of the second coupler 24, which can be 80:20 or 50:50.

Figure 3:
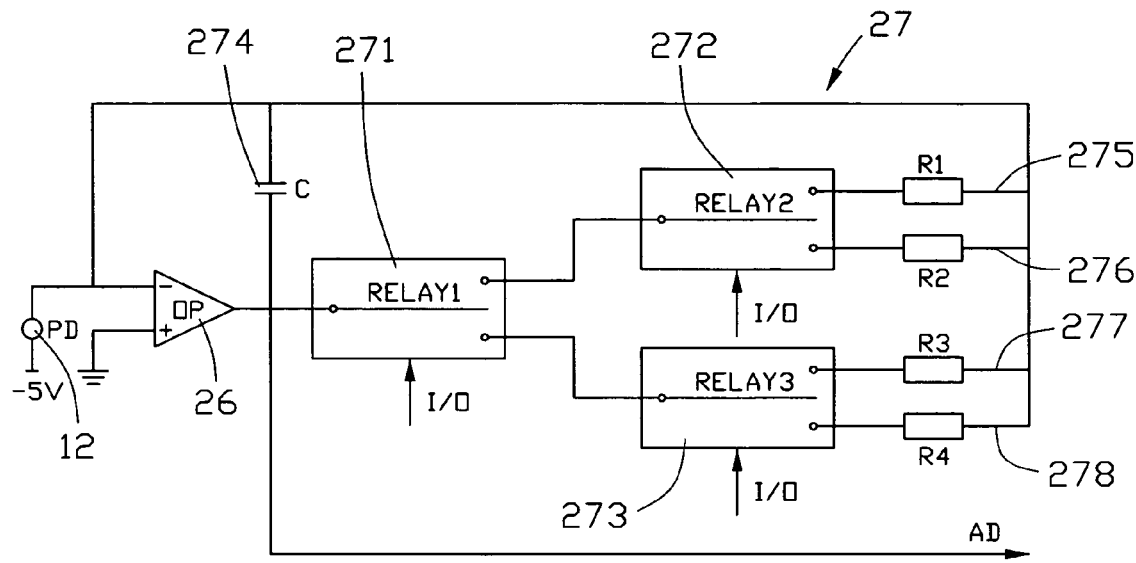
FIG. 3 is a circuit diagram of the relay control device in accordance with the present invention.

With reference to FIG. 3 in the mean time, the module 10 includes an optical detecting device 12 which can be a photo diode (PD) device, an operation amplifying device (OP) 26, an analog-digital conversion (AD) device 15, a relay control device 27, and a micro-control unit (MCU) 28. The micro-control unit 28 can perform the function of 24 bit AD collection. The micro-control unit 28 is respectively connected to a liquid crystal device (LCD) 29 and a personal computer (PC) 30 via a RS-232 port.

The relay control device 27 has first, second and third relay means 271, 272 and 273. The input port of the first relay 271 is connected to the output port of the operation amplifying device 26. The input ports of the second and third relay 272, 273 are respectively connected to the first and second output ports of the first relay means 271. Moreover, corresponding voltages are respectively applied to the first, second and third relay means 271, 272 and 273 via according I/O ports.

The relay control device 27 also comprises a capacitor 274 with one end thereof connected with the input port of the first relay means 271, and first, second, third and fourth resistors 275, 276, 277 and 278. One common end of the first, second, third and fourth resistors 275, 276, 277 and 278 are together connected to the end of the capacitor 274 opposite to the first relay means 271. The other ends of the first and second resistors 275, 276, which are respectively opposite to the capacitor 274, are respectively connected to the first and second output ports of the second relay means 272. At the same time, the other ends of the third and fourth resistors 277, 278, which are respectively opposite to the capacitor 274, are respectively connected to the first and second output ports of the third relay means 273.

The output port of the operation amplifying device 26 is not only connected to the capacitor 274, but also connected to the output port of the relay control device 27 and then send corresponding signals to the analog-digital conversion device 15. The end of the capacitor 274, which is opposite to the first relay means 271, is not only connected to the four resistors 275, 276, 277 and 278, but also is respectively connected with the first input port of the operation amplifying device 26 and the output port of the optical exploring device 12 so as to function as a feedback circuit thereof. The second input port of the operation amplifying device 26 is grounded, and the voltage difference between the input port of the optical exploring device 12 and the second input port of the operation amplifying device 26 is pre-determined to be −5v.

Figure 4:
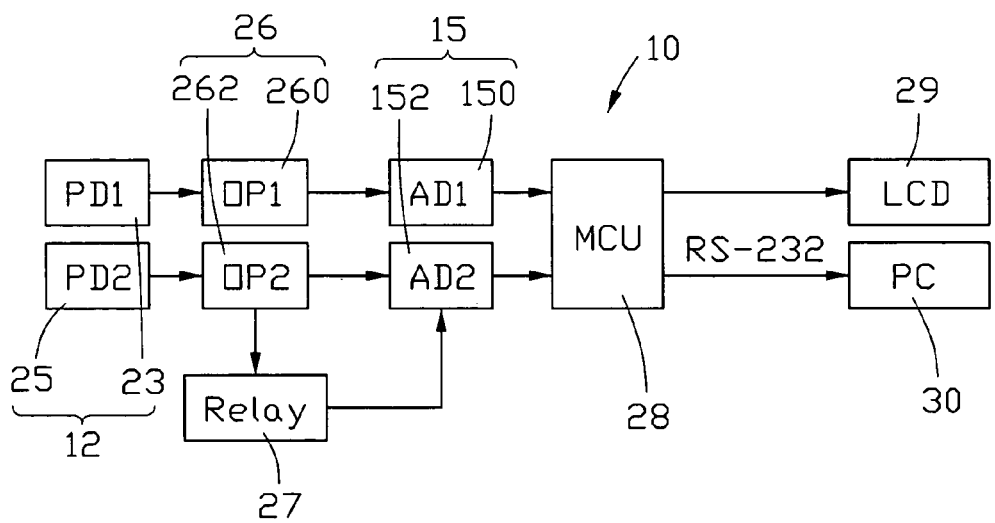
FIG. 4 is a circuit diagram of the module in accordance with the present invention.

FIG. 4 shows a detailed embodiment of the module 10 in accordance with the present invention. In this embodiment, the optical exploring device 12 of the module 10 includes first and second optical detecting means 23, 25. The operation amplifying device 26 comprises first and second operation amplifiers 260, 262, among which the input port of the first optical detecting means 23 is connected to the third port 103 of the first coupler 22, and the output port of the first optical detecting means 23 is connected to the input port of the first operation amplifier 260. The input port of the second optical detecting means 25 is connected to the second port 202 of the second coupler 24, and the output port thereof is connected to the input port of the second operation amplifier 262.

The module 10 further comprises an analog-digital conversion device 15 positioned between the operation amplifying device 26 and the micro-control unit 28. The analog-digital conversion device 15 includes first and second analog-digital conversion means 150 and 152, whose input ports thereof are both connected with the output ports of the first and second operation amplifiers 260, 262 for converting corresponding analog signals into according digital signals which are to be sent to the micro-control unit 28. Here, the output port of the relay control device 27 is connected to the second analog-digital conversion means 152.

Hence, the principle of the optical return loss measuring or exploring device in accordance with the present can be expatiated as below:

The light source 20 emits light to the isolator 21 thereby forming the light path ①. The light enters into the first coupler 22 after leaving the isolator 21 and then is divided into two portions which ext the first coupler 22 respectively via the third and fourth ports 103 and 104 thereby forming light paths ② and ③. The light path ② is directed to the first optical detecting means 23 and then is sent to the micro-control unit 28 via the operation amplifying device 26. The light path ③ is directed to the second coupler 24 and then further be divided into another two portions which are outputted of the second coupler 24 respectively via the third and fourth ports 203 and 204 thereby forming light paths ④ and ⑤. Among which, the light path ④ is directed to the DUT 32 and the light path ⑤ is coiled to be used up the light transmitted therethrough.

As a result of the reflection by the DUT 32, a part of the reflected light by the DUT 32 via the light path ④ is then reflected by the second coupler 24 to the isolator 21 so that no reflected light can be isolated before it can enter into the light source 20. The other part of the reflected light by the DUT 32 will form the light path ④ and then is inputted into the second optical detecting means 25 for converting corresponding optical signals into current signals which will be changed into voltage signals after passing through the second operation amplifier 262 and then are sent to the micro-control unit 28 by the relay control device 27 to be adjusted to a suitable level. In the mean time, the light inputted to the first optical detecting means 23 via the light path ② is changed into current signals which are then sent to the first operation amplifier 260 of the operation amplifying device 26, where the current signals are changed into voltage signals and then are sent to the micro-control unit 28.

Refer to FIG. 3 at the same time, the values of the current outputted to the first analog-digital conversion device 152 (AD2) can be adjusted at four different levels. This is achieved by controlling the second and third relay means 272 and 273 of the relay control device 27 so that correspondent first, second, third and fourth resistors 275, 276, 277 and 278 can be selected to be switched on thereby realizing the different current outputs to the first analog-digital conversion device 152 at different levels.

The resistance values of the first, second, third and fourth resistors 275, 276, 277 and 278 can be 400 ohm, 20 K ohm, 1 M ohm and 50M ohm, which is increased by 50 multiples thereof., so as to control the second analog-digital conversion means 152. The first analog-digital conversion means 150 is mainly used to monitor whether the power of the light source 20 varies or not, and then functions to adjust the detected signals.

The voltage signals converted by the operation amplifying device 26 firstly go through the analog-digital conversion device 15 for converting corresponding analog signals into digital signals, and then are sent to the micro-control unit 28. The micro-control unit 28 can finally get the value of the optical return loss by the DUT 32 by calculating the voltage or current values collected by the two AD collection paths of the first and second analog-digital conversion means 150 and 152. The value of the optical return loss are then outputted to the LCD 29 to display thereon, and can send relevant information to the calculator 30 via RS232 port thereof.

In addition, the optical return loss measuring or exploring device 1 in accordance with the present invention can also have the function of measuring/exploring optical insertion loss thereof by simply modifying the exploring device 1. For example, just remove the second coupler 24 and then connect the output port of the DUT 32 to the second optical detecting means 25.

Moreover, if the light source 20 is instead of light pulses, and according arrangements, which are correlated to time, are added to the present invention, the optical RL measuring or exploring device 1 can be modified to an optical time domain reflectometer (OTDR), which can measure the value of reflected light by a specific optical component or a specific interface which is positioned a certain distance away from the light source 20 thereof, thereby determining whether the optical component or interface is working normally or not.

When the optical RL measuring or exploring device 1 of the present invention is used to measure some faint reflected light, it adopts the solid-status relay control device 27 to replace a traditional analog switch, which can make the resistance thereof approaches zero when switched on thereby gaining a better linear performance thereof when optical signals are conversed into electrical signals so as to increase the exploring precision thereof. In addition, the coupling ratios of the first and second couplers 22 and 24 are respectively selected to be 99:1 and 80:20, which can ensure the high precision of the tested RL values thereof.

In the present invention, the isolator 21 is added between the laser light source 20 and the first coupler 22 so that light reflected back from the light propagation paths thereof can be prevented enter the laser light source 20, which ensures the stable output by the light source 20. In addition, by adopting the micro-control unit 28 with the integrated function of 24 bit AD collection, the optical RL measuring or exploring device 1 of the present invention is more compact in structure thereof, and interferences between the components therein can be effectively reduced consequently.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. An optical return loss detecting device for measuring the optical return loss (ORL) of a device under test (DUT), comprising a light source, an optical isolator connected to the light source for preventing reflected light by the DUT entering the light source, a first optical coupler connected to the isolator, a second optical coupler connected to the first coupler and the DUT respectively, and a module communicating with the second coupler for performing test and calculation functions thereof.

2. The optical return loss detecting device as claimed in claim 1, wherein the light source is a laser diode.

3. The optical return loss detecting device as claimed in claim 1, wherein the micro-control unit is respectively connected to a liquid crystal display device and a calculator.

4. The optical return loss detecting device as claimed in claim 1, wherein the isolator is connected to a first port of the first coupler, a third port of the first coupler is connected to the module and a fourth port of the first coupler is connected to a first port of the second coupler; a second port of the second coupler is connected to the module, and a third port of the second coupler is connected to the DUT.

5. The optical return loss detecting device as claimed in claim 4, wherein the light source is a laser diode.

6. The optical return loss detecting device as claimed in claim 4, wherein the micro-control unit is respectively connected to a liquid crystal display device and a calculator.

7. The optical return loss detecting device as claimed in claim 4, wherein the coupling ratio between the third and fourth ports of the first coupler is 1:99.

8. The optical return loss detecting device as claimed in claim 7, wherein the coupling return ratio between the third and fourth ports of the second coupler is 80:20.

9. The optical return loss detecting device as claimed in claim 7, wherein the coupling return ratio between the third and fourth ports of the second coupler is 50:50.

10. The optical return loss detecting device as claimed in claim 4, wherein the module includes an optical exploring device, an operation amplifying device, a relay control device and a micro-control unit which are connected with each other in turn.

11. The optical return loss detecting device as claimed in claim 10, wherein the micro-control unit can perform the function of 24 bit AD collection.

12. The optical return loss detecting device as claimed in claim 10, wherein the light source is a laser diode.

13. The optical return loss detecting device as claimed in claim 10, wherein the micro-control unit is respectively connected to a liquid crystal display device and a calculator.

14. The optical return loss detecting device as claimed in claim 10, wherein the relay control device includes first, second and third relay means, among which the input port of the first relay means is connected to the output port of the operation amplifying device, and the input ports of the second and third relay means are respectively connected to the first and second output ports of the first relay means.

15. The optical return loss detecting device as claimed in claim 14, wherein the relay control device also includes a capacitor, one end of the capacitor is respectively connected to the input port of the first relay means and the output port of the operation amplifier, and the other end thereof is respectively connected to the first input port of the operation amplifying device and the output port of the optical exploring device.

16. The optical return loss detecting device as claimed in claim 15, wherein the output port of the optical exploring device is connected to the first input port of the operation amplifying device, and the second input port of the operation amplifying device is grounded.

17. The optical return loss detecting device as claimed in claim 16, wherein the voltage difference between the input port of the optical exploring device and the second input port of the operation amplifying device is −5v.

18. The optical return loss detecting device as claimed in claim 17, wherein the relay control device further comprises first, second, third and fourth resistors, among which one end of each of the four resistors are together connected to the end of the capacitor opposite to the first relay means; the ends of the first and second resistors, which are both opposite to the capacitor, are respectively connected to the first and second output ports of the second relay means; and the ends of the third and fourth resistors; which are both opposite to the capacitor, are respectively connected to the first and second output ports of the third relay means.

19. The optical return loss detecting device as claimed in claim 18, wherein the resistance values of the first, second, third and fourth resistors are increased according to the pre-determined multiple relationship so as to realize corresponding control of the module.

20. The optical return loss detecting device as claimed in claim 19, wherein the resistance values of the first, second, third and fourth resistors are increased according to a 50 multiple relationship.

21. The optical return loss detecting device as claimed in claim 20, wherein the resistance values of the first, second, third and fourth resistors are 400 ohm, 20 K ohm, 1 M ohm, and 50 M ohm respectively.

22. The optical return loss detecting device as claimed in claim 11, wherein corresponding voltages are applied onto the first, second, third and fourth relay means via according I/O ports.

23. The optical return loss detecting device as claimed in claim 15, wherein the optical exploring device includes first and second optical detecting means, and the operation amplifying device comprises first and second operation amplifiers.

24. The optical return loss detecting device as claimed in claim 23, wherein the input port of the first optical detecting means is connected to the third port of the first coupler, and the output port thereof is connected to the operation amplifying device; the input port of the second optical detecting means is connected to the second port of the second coupler, and the output port thereof is connected to the operation amplifying device.

25. The optical return loss detecting device as claimed in claim 24, wherein the input port of the first optical detecting means is connected to the input port of the first operation amplifier, and the output port of the second optical detecting means is connected to the input port of the second operation amplifier.

26. The optical return loss detecting device as claimed in claim 25, wherein the module also includes an analog-digital conversion device which is positioned between the operation amplifying device and the micro-control device.

27. The optical return loss detecting device as claimed in claim 26, wherein the end of the capacitor, which is connected to the input port of the first relay means and the output port of operation amplifying device, is also connected to the analog-digital conversion device.

28. The optical return loss detecting device as claimed in claim 27, wherein the analog-digital conversion device includes first and second analog-digital conversion means, whose output ports are both connected to the micro-control unit and the input ports thereof are connected respectively to the output ports of the first and second operation amplifiers for converting according analog signals into digital signals which are then inputted into the micro-control unit.

29. The optical return loss detecting device as claimed in claim 28, wherein the coupling ratio between the third and fourth ports of the first coupler is 1:99.

30. The optical return loss detecting device as claimed in claim 29, wherein the coupling ratio between the third and fourth ports of the second coupler is 80:20.

31. The optical return loss detecting device as claimed in claim 29, wherein the coupling ratio of the third and fourth ports of the second coupler is 50:50.

32. The optical return loss detecting device as claimed in claim 28, wherein the micro-control unit is connected to a computer via a RS-232 port.

33. An exploring device for exploring optical devices, comprising: a light source, an optical coupler connected to the light source, a device under test (DUT) connected to the coupler and a module for performing exploring and calculation functions, wherein the light source is connected to the first port of the coupler, the third port of the coupler is connected to the module, the fourth port of the coupler is connected the input port of the DUT, and the module is connected to the output port of the DUT so as to exploring the return loss (RL) of the DUT.

34. An exploring device for exploring the optical characteristics of a light propagation path, comprising: a light source which can emit light pulses, an optical isolator connected to the light source, a first coupler connected to the isolator, a second coupler which is connected to the first coupler and is connected to the light propagation path, and a module for exploring time responses; wherein the isolator is connected to the first port of the first coupler, the third port of the first coupler is connected to the module, the fourth port of the first coupler is connected to the first port of the second coupler, the second port of the second coupler is connected to the module, the third port of the second coupler is connected to the light propagation path.

* * * * *